(12) United States Patent
Robertson et al.

(10) Patent No.: US 10,694,325 B2
(45) Date of Patent: Jun. 23, 2020

(54) DETERMINING POSITION OF A DEVICE IN THREE-DIMENSIONAL SPACE AND CORRESPONDING CALIBRATION TECHNIQUES

(71) Applicant: GOOGLE LLC, Mountain View, CA (US)

(72) Inventors: Patrick Robertson, San Jose, CA (US); Brian Williams, Mountain View, CA (US); Maria Jesus Garcia Puyol, Mountain View, CA (US); Etienne Le Grand, Mountain View, CA (US); Mohammed Khider, Mountain View, CA (US); Luigi Bruno, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 45 days.

(21) Appl. No.: 15/844,384

(22) Filed: Dec. 15, 2017

(65) Prior Publication Data

US 2018/0255431 A1    Sep. 6, 2018

Related U.S. Application Data

(60) Provisional application No. 62/441,304, filed on Dec. 31, 2016.

(51) Int. Cl.
| | |
|---|---|
| *H04W 4/02* | (2018.01) |
| *H04B 17/318* | (2015.01) |
| *G01C 5/06* | (2006.01) |
| *G01C 21/08* | (2006.01) |
| *G01S 11/06* | (2006.01) |
| *G01S 5/02* | (2010.01) |

(Continued)

(52) U.S. Cl.
CPC .............. *H04W 4/023* (2013.01); *G01C 5/06* (2013.01); *G01C 21/005* (2013.01); *G01C 21/08* (2013.01);
(Continued)

(58) Field of Classification Search
CPC ..... H04W 4/023; H04B 17/27; H04B 17/318; G01C 5/06; G01C 21/005
(Continued)

(56) References Cited

U.S. PATENT DOCUMENTS

| | | |
|---|---|---|
| 8,626,443 B2 | 1/2014 | Robertson et al. |
| 8,838,846 B1 | 9/2014 | Tang et al. |

(Continued)

OTHER PUBLICATIONS

"Ion GNSS+ 2018" (2018). Retreieved from the internet at: URL:https://www.ion.org/gnss.tutorials.cfm#TUT14.
(Continued)

*Primary Examiner* — Shahriar Behnamian
(74) *Attorney, Agent, or Firm* — Marshall, Gerstein & Borun LLP

(57) ABSTRACT

Positioning mobile devices in a three-dimensional space includes receiving multiple traces, each trace corresponding to a sequence of atmospheric pressure readings from a respective mobile device, receiving indications of signals received by the mobile devices from signal sources concurrently with the atmospheric pressure readings, generate similarity metrics for the multiple traces using the indications of other signals received by the mobile devices, the similarity metrics being indicative of associations between the signal sources and the atmospheric pressure readings, and determine estimated changes in elevation over time for the multiple traces using the generated similarity metrics.

20 Claims, 14 Drawing Sheets

(51) Int. Cl.

| | |
|---|---|
| *G01S 19/46* | (2010.01) |
| *H04B 17/27* | (2015.01) |
| *G01C 21/00* | (2006.01) |
| *G01S 19/45* | (2010.01) |
| *G01S 19/48* | (2010.01) |
| *H04W 84/12* | (2009.01) |
| *G01C 21/20* | (2006.01) |

(52) U.S. Cl.
CPC .............. *G01S 5/0252* (2013.01); *G01S 11/06* (2013.01); *G01S 19/45* (2013.01); *G01S 19/46* (2013.01); *H04B 17/27* (2015.01); *H04B 17/318* (2015.01); *G01C 21/206* (2013.01); *G01S 19/48* (2013.01); *H04W 84/12* (2013.01)

(58) Field of Classification Search
USPC ..................................... 455/456.1–456.6, 457
See application file for complete search history.

(56) References Cited

U.S. PATENT DOCUMENTS

| | | | |
|---|---|---|---|
| 9,357,520 | B2 | 5/2016 | Le Grand et al. |
| 9,459,104 | B2 | 10/2016 | Le Grand |
| 9,544,871 | B2 | 1/2017 | Le Grand et al. |
| 2010/0156708 | A1* | 6/2010 | Chen ........................ G01S 19/48 342/451 |
| 2012/0121161 | A1 | 5/2012 | Eade et al. |
| 2012/0232795 | A1 | 9/2012 | Robertson et al. |
| 2013/0181834 | A1* | 7/2013 | Bentley .............. G08B 13/2462 340/539.13 |
| 2013/0244688 | A1 | 9/2013 | Huang et al. |
| 2013/0317944 | A1 | 11/2013 | Huang et al. |
| 2013/0332064 | A1 | 12/2013 | Funk et al. |
| 2013/0332065 | A1 | 12/2013 | Hakim et al. |
| 2014/0295878 | A1 | 10/2014 | Yang et al. |
| 2015/0031390 | A1 | 1/2015 | Robertson et al. |
| 2015/0042516 | A1* | 2/2015 | Cui .......................... G01S 1/02 342/450 |
| 2015/0222372 | A1 | 8/2015 | Le Grand et al. |
| 2015/0223189 | A1 | 8/2015 | Le Grand et al. |
| 2016/0033266 | A1 | 2/2016 | Le Grand et al. |
| 2016/0198431 | A1* | 7/2016 | Pattabiraman ........ H04W 4/029 455/414.2 |
| 2016/0258782 | A1 | 9/2016 | Sadjadi et al. |
| 2017/0048816 | A1 | 2/2017 | Myeong et al. |

OTHER PUBLICATIONS

Abdelnasser et al., "SemanticSLAM: Using Environment Landmarks for Unsupervised Indoor Localization," in IEEE Transactions on Mobile Computing, vol. 15, No. 7, pp. 1770-1782, Jul. 1, 2016.

Devoe, "Unsupervised Indoor Localization No Need to War-Drive," Networked Embedded Systems (2012).
Grebmann et al., "Towards Ubiquitous Indoor Location Based Services and Indoor Navigation," 7th Workshop on Positioning, Navigation and Communication (2010).
Kaiser et al., "Map-Aided Indoor Navigation," Indoor Wayfinding and Navigation, pp. 107-136 (2015).
Khider et al., "Global navigation satellite system pseudorange-based multisensor positioning incorporating a multipath error model," IET Radar, Sonar & Navigation, vol. 7(8): 881-894 (2013).
Li et al., "Using Barometers to Determine the Height for Indoor Positioning," International Global Navigation Satellite Systems Society IGNSS Symposium (2013).
Liu et al., "Beyond Horizontal Location Context: Measuring Elevation Using Smartphone's Barometer," UBICOMP Adjunct, pp. 459-468 (2014).
Puyol et al., "Pedestrian Simultaneous Localization and Mapping in Multistory Buildings Using Inertial Sensors," IEEE Transactions on Intelligent Transportation Systems, 15(4):1714-1727 (2014).
Robertson et al., "Collaborative Pedestrian Mapping of Buildings Using Inertial Sensors and FootSLAM," Proceedings of the 24th International Technical Meeting of the Satellite Division of the Institute of Navigation, pp. 1366-1377 (2011).
Robertson et al., "Simultaneous localization and mapping for pedestrians using only foot-mounted inertial sensors," Proceedings of the 11th International Conference on Ubiquitous Computing, pp. 93-96 (2009).
Shen et al., "BarFi: Barometer-Aided Wi-Fi Floor Localization Using Crowdsourcing," 2015 IEEE 12th International Conference on Mobile Ad Hoc and Sensor Systems, pp. 416-424 (2015).
Shen et al., "Walkie-Markie: indoor pathway mapping made easy," In Proceedings of the 10th USENIX conference on Networked Systems Design and Implementation, pp. 1-14 (2013).
Slideplayer.com, "No Need to War-Drive: Unsupervised Indoor Localization," (2014). Interactive presentation available at URL:http://slideplayer.com/slide/8000922/.
Wang et al., "No need to war-drive: unsupervised indoor localization," In Proceedings of the ACM 10th international conference on Mobile systems, applications, and services, pp. 197-210 (2012).
Ye et al., "B-Loc: Scalable Floor Localization using Barometer on Smartphone," 2014 IEEE 11th International Conference on Mobile Ad Hoc and Sensor Systems, pp. 127-135 (2014).
Youssef, "Towards truly ubiquitous indoor localization on a world-wide scale," In Proceedings of the 23rd ACM SIGSPATIAL International Conference on Advances in Geographic Information Systems (GIS '15).
Zaliva et al., "Barometric and GPS Altitude Sensor Fusion," IEEE International Conference on Acoustic, Speech and Signal Processing (ICASSP), pp. 7575-7579 (2014).

* cited by examiner

DETERMINING POSITION OF A DEVICE IN THREE-DIMENSIONAL SPACE AND CORRESPONDING CALIBRATION TECHNIQUES

CROSS-REFERENCE TO RELATED APPLICATION

This application claims priority to provisional U.S. Application Ser. No. 62/441,304, Filed on Dec. 31, 2016, titled "DETERMINING POSITION OF A DEVICE IN THREE-DIMENSIONAL SPACE AND CORRESPONDING CALIBRATION TECHNIQUES," the entire disclosure of which is hereby expressly incorporated by reference herein.

FIELD OF THE DISCLOSURE

The present disclosure relates to positioning and mapping techniques and, more particularly, to techniques for localizing signal sources and/or portable devices, with or without simultaneous mapping of geographic areas.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally speaking, techniques for positioning computing devices rely on high-altitude signal sources as Global Positioning System (GPS) satellites or pseudo-satellites, terrestrial signal sources such as 802.11 (or Wi-Fi™) access points or cellular base stations, or proximity sensing. For example, a portable computing device such as a smartphone can receive GPS signals from several satellites and determine its location on the surface of the Earth based on these signals. Similarly, a portable computing device can determine its location using a signal from an 802.11 access point or, for greater accuracy, signals from several 802.11 access points.

However, GPS satellites generally are obscured inside buildings, tunnels, underground, etc., causing multipath errors or failure to generate a positioning fix at all. Moreover, GPS positioning techniques generally are not optimized for determining elevation, and, as a result, the vertical component of a typical GPS positioning fix is relatively inaccurate even when GPS signals are not occluded. To the extent that a barometer can be used to determine elevation, barometer measurements often also are highly inaccurate.

SUMMARY

A system of this disclosure receives sequences of atmospheric pressure measurements from multiple portable devices in a certain geographic area along with the corresponding readings of GPS signals, signals of from access points of wireless communication networks, beacons, magnetic signals, and/or other "signals of opportunity." The system can generate similarity metrics that provide a quantitative indication of how similar or dissimilar certain traces are. For example, a similarity metric can indicate how close signal strength measurements for a certain wireless access point (AP) are for several mobile devices, at a certain time. Using the similarity metrics, the system can group data points, and particularly atmospheric pressure measurements, from different traces. The system then can determine how traces from the portable devices change in elevation over time to determine 3D geometry of the geographic area. In some cases, the system can determine geometric features of multi-story buildings and/or "landmarks" (e.g., access points with the strongest signals) using traces with certain similarity metrics. The system in various implementation further can estimate the number of floors in a building, floor separation, locations of stairwells and vertical transport, etc.

To improve the accuracy of estimating elevation, the system can use current weather conditions to account for the impact of weather of atmospheric pressure measurements. In some implementations, the system generates calibration data, such as expected air pressure measurements at particular geographic locations, in view of terrain information. The system then provides this calibration data to mobile (or "portable") devices for calibrating the respective sensors such as barometers. Once calibrated, a mobile device can similarly generate calibration data and provide this data to peer devices. Moreover, the mobile device in some implementations can operate as a roving weather station.

One example implementation of these techniques is a method of positioning mobile devices in a three-dimensional space. The method includes receiving, by one or more processors, multiple traces, each trace corresponding to a sequence of atmospheric pressure readings from a respective mobile device; receiving, by the one or more processors, indications of signals received by the mobile devices from signal sources concurrently with the atmospheric pressure readings; generating, by the one or more processors, similarity metrics for the multiple traces using the indications of other signals received by the mobile devices, the similarity metrics being indicative of associations between the signal sources and the atmospheric pressure readings; and determining, by the one or more processors, estimated changes in elevation over time for the multiple traces using the generated similarity metrics.

Another example implementation of these techniques is a method of calibrating devices including receiving, by one or more processors, an indication of current weather conditions at a geographic area; obtaining, by the one or more processors from a database, elevation data for the geographic area; generating, by the one or more processors, expected measurements of atmospheric pressure at the geographic area using the indication of weather conditions and the elevation data for the geographic area; and causing at least one mobile device located in the geographic area and equipped with a barometer to calibrate the barometer using the expected measurements of atmospheric pressure.

Figure 1:
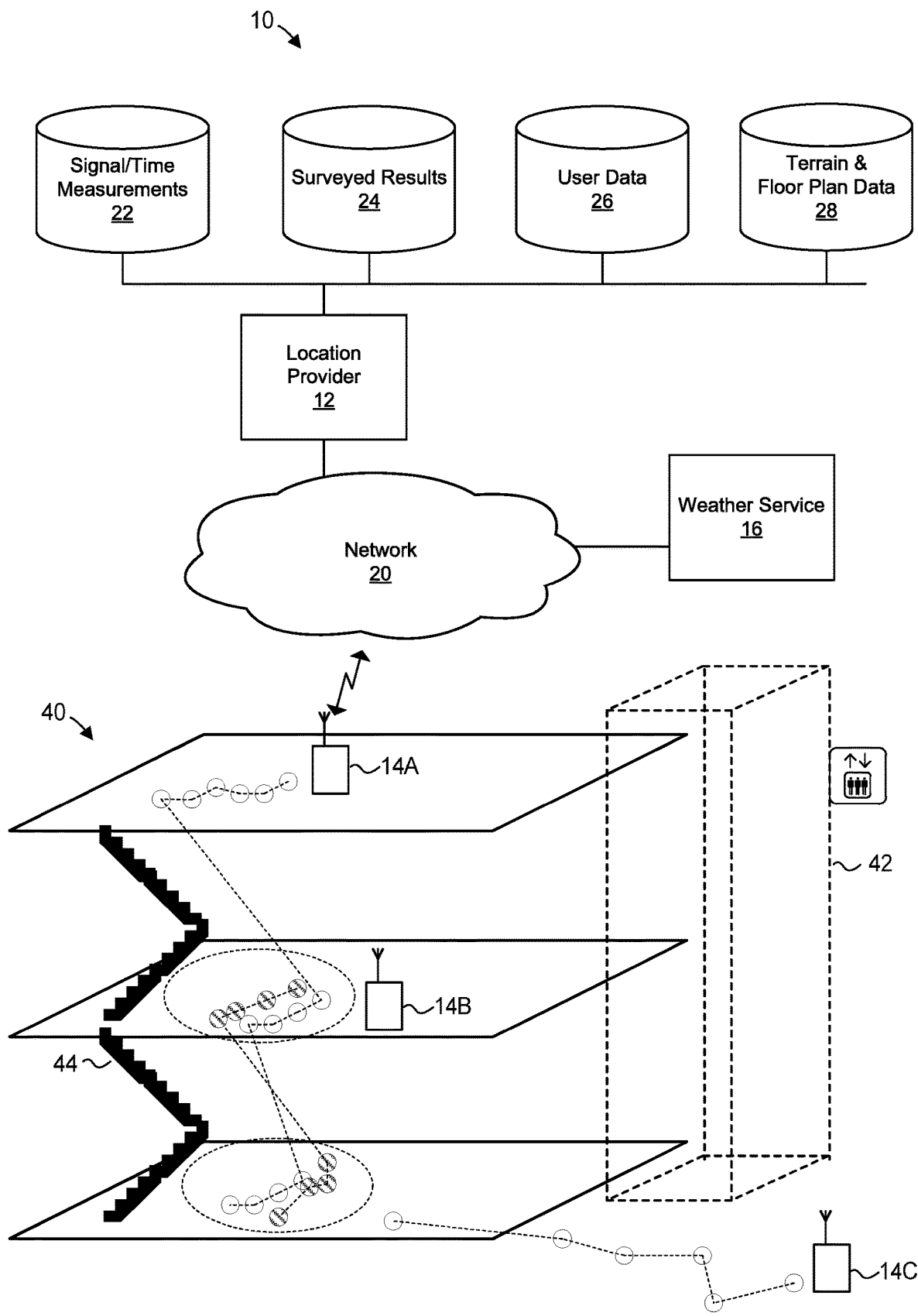
FIG. 1 is a block diagram of an example computing system in which the positioning and calibration techniques of this disclosure can be implemented.
Figure 3:
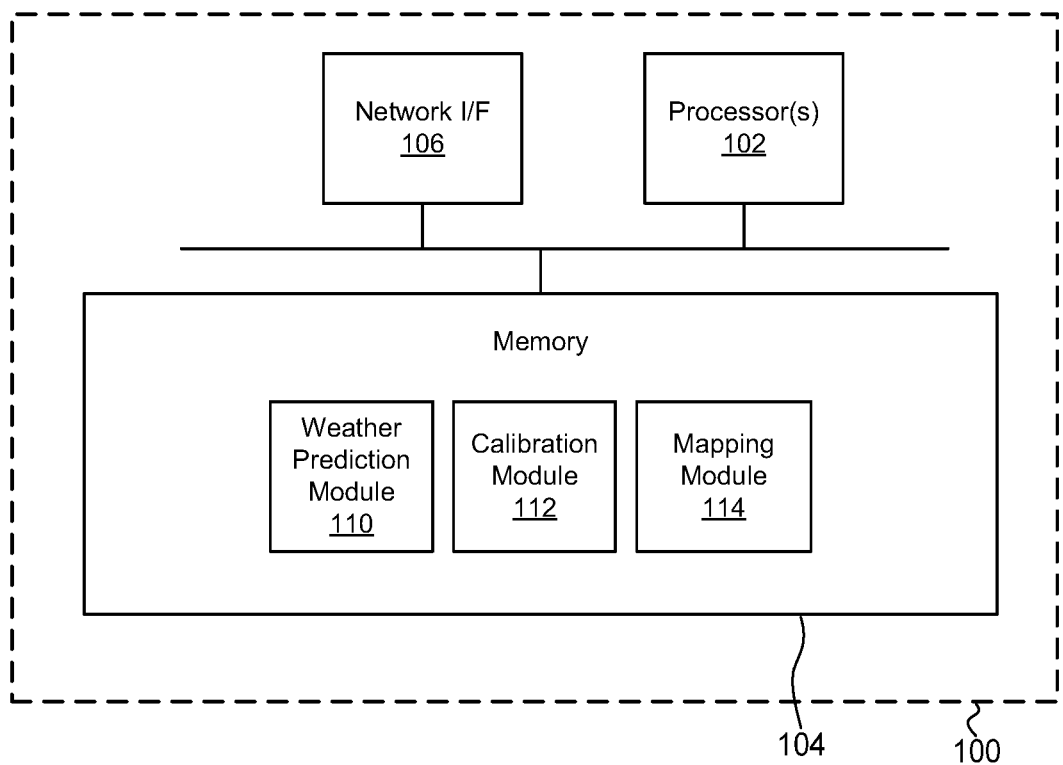
FIG. 3 is a block diagram of an example server that can operate in the system of FIG. 1.
Figure 6:
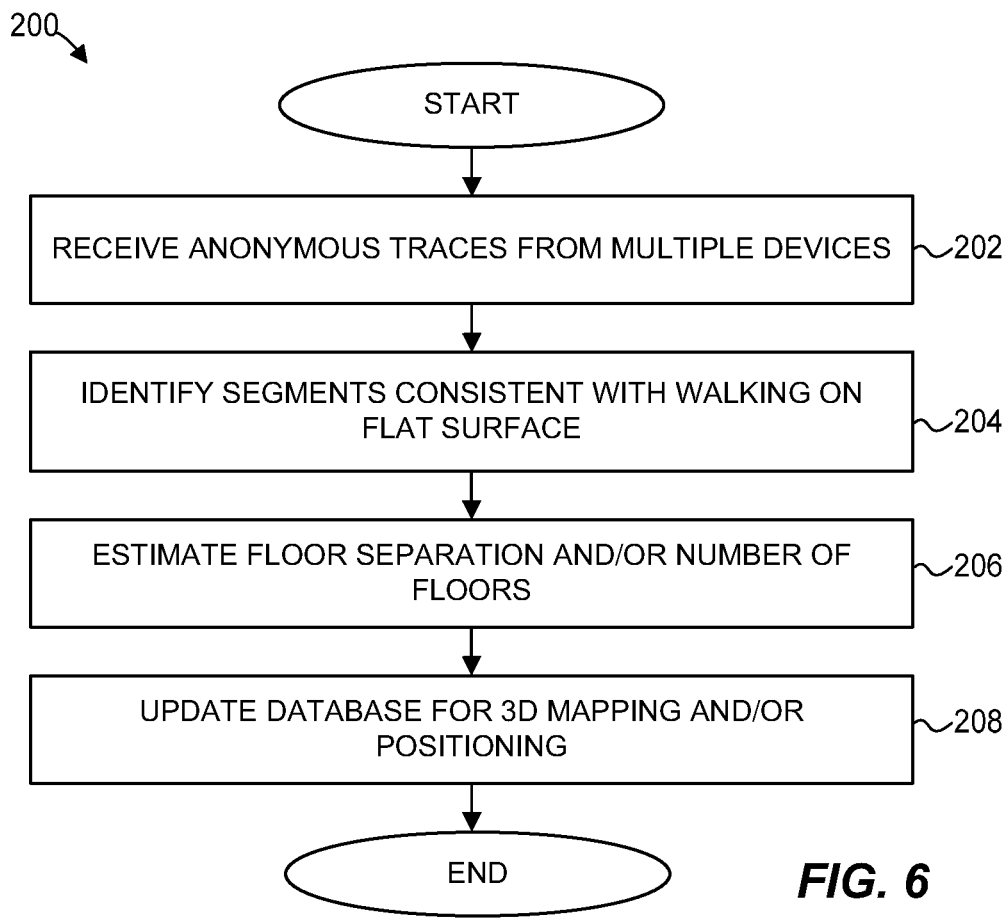
Figure 7:
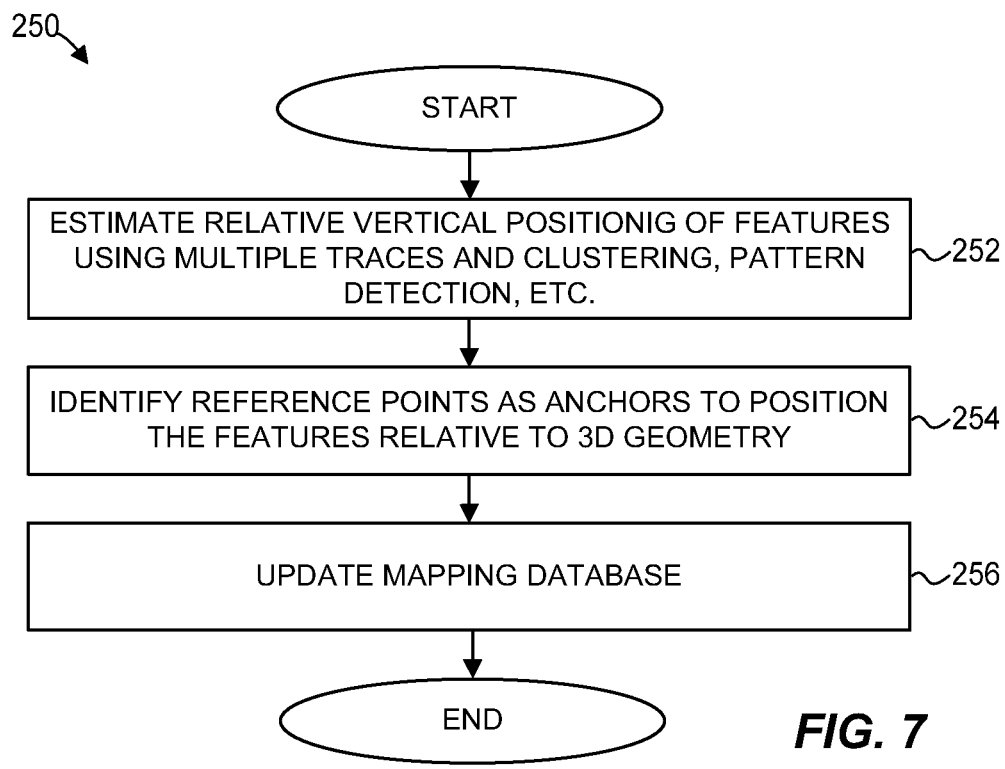
Figure 8:
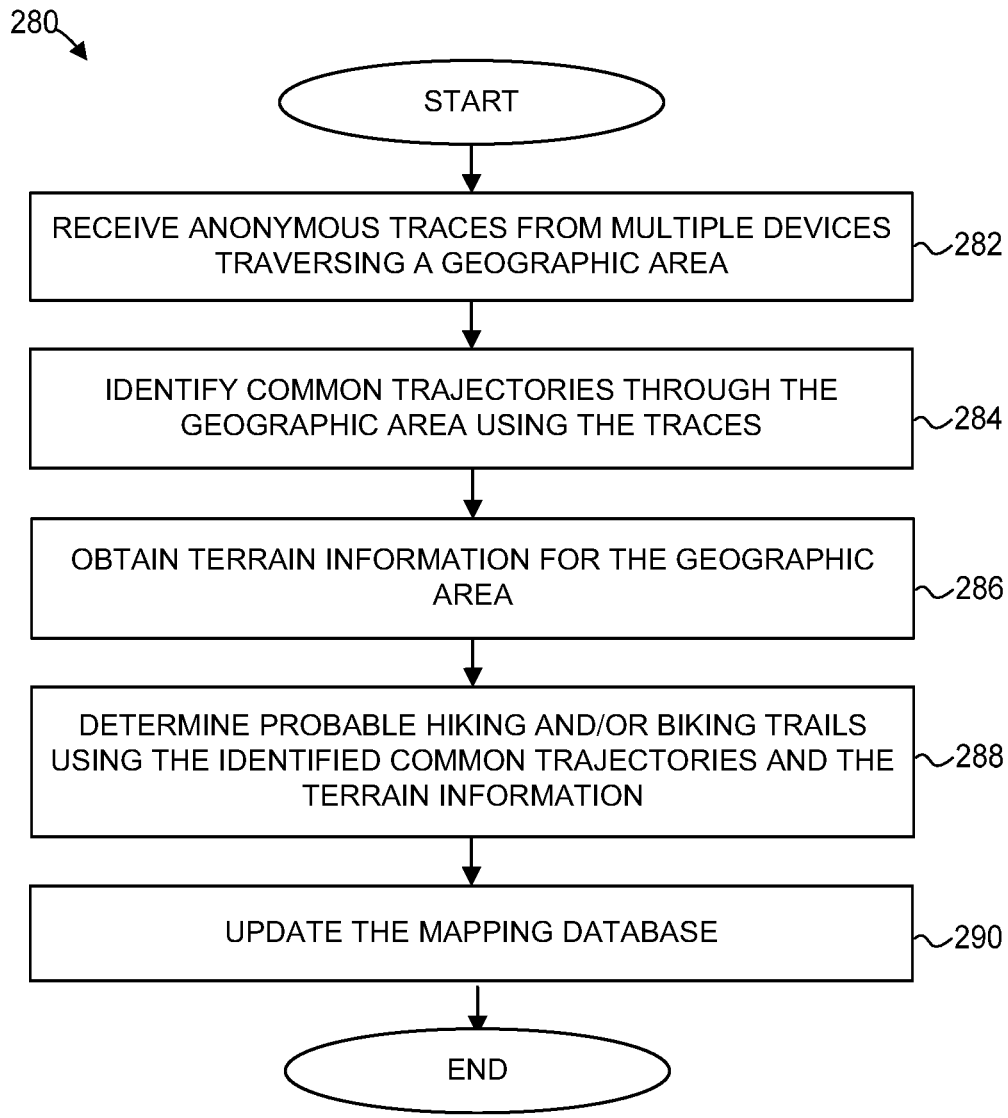
Figure 9:
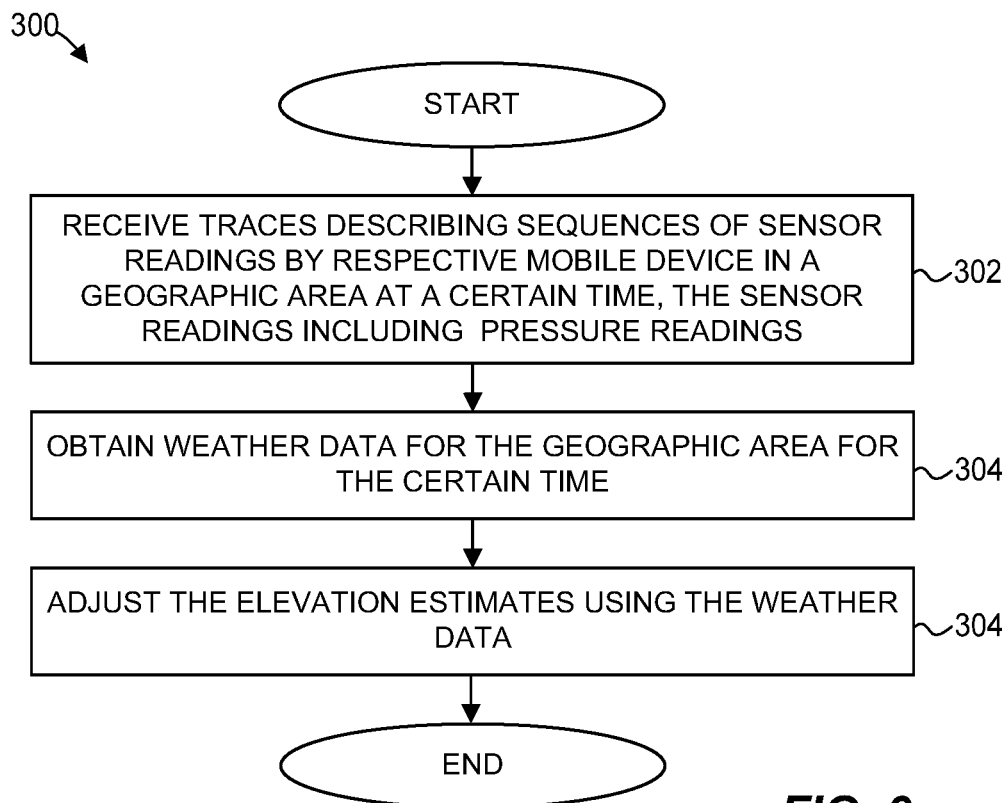
Figure 10:
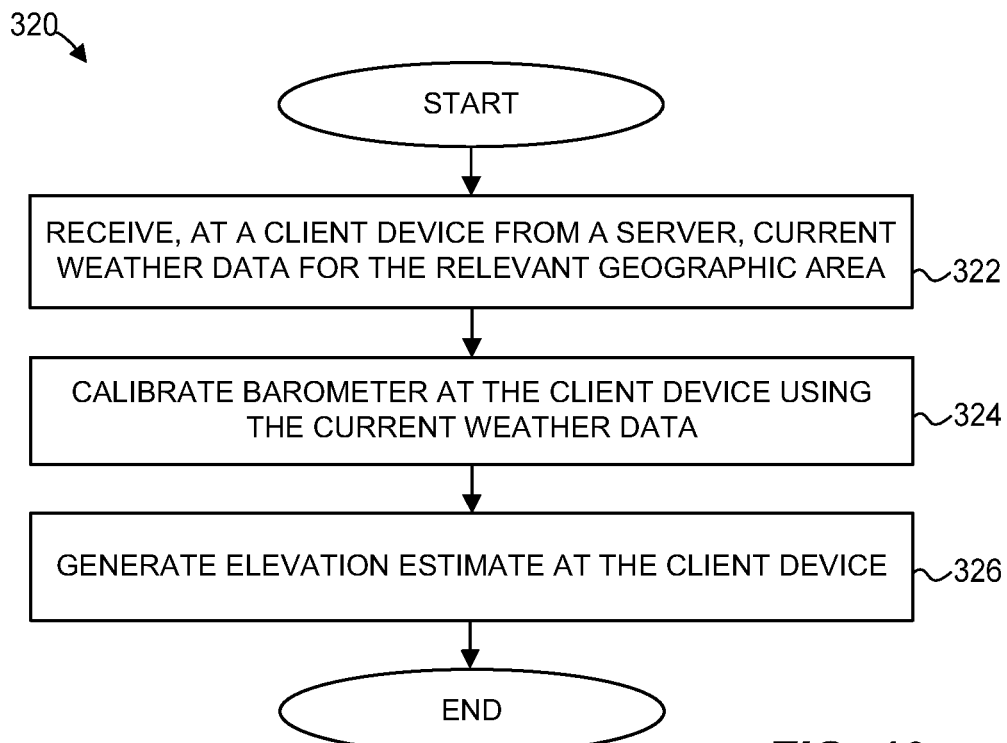
Figure 11:
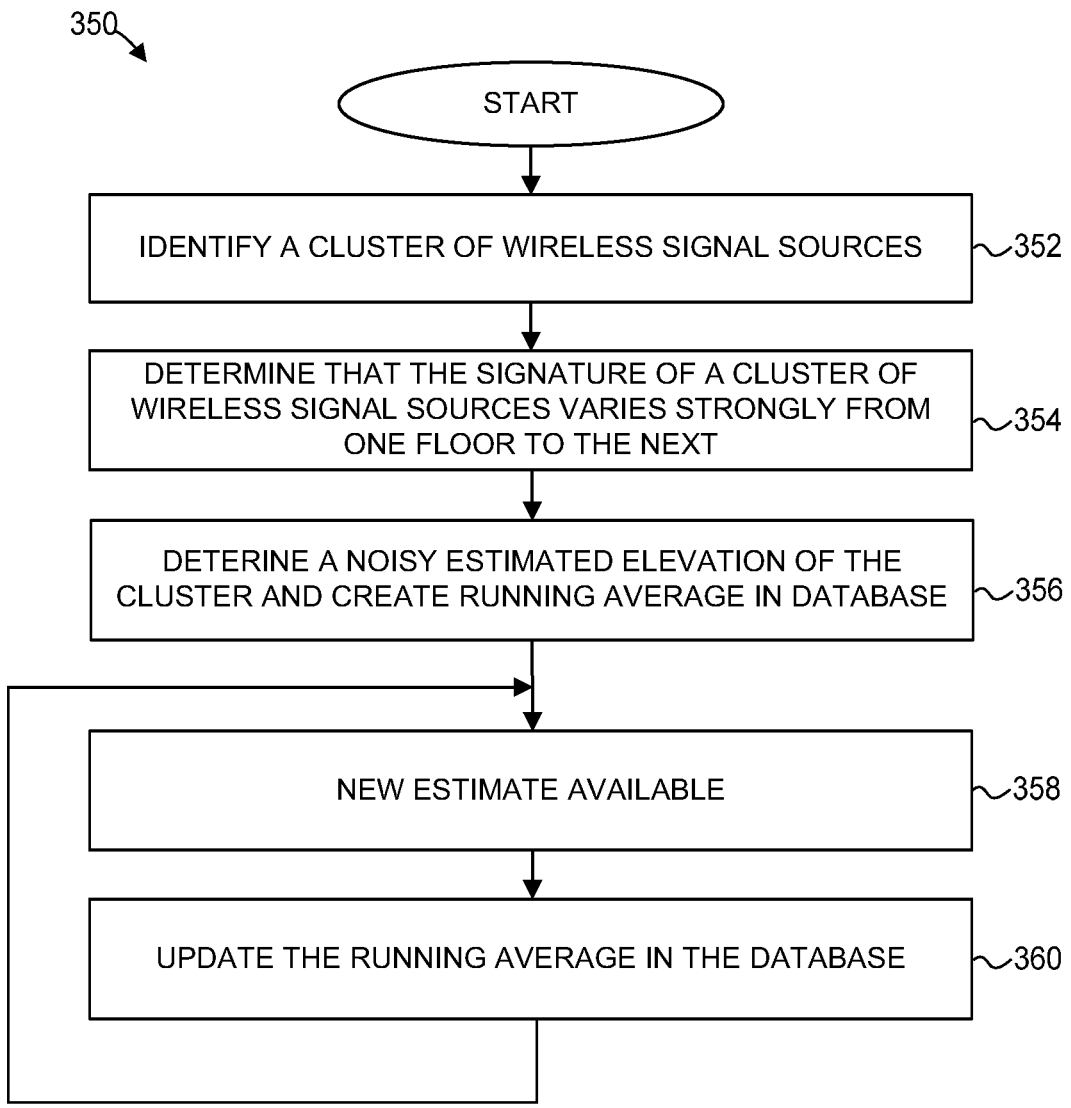
Figure 12:
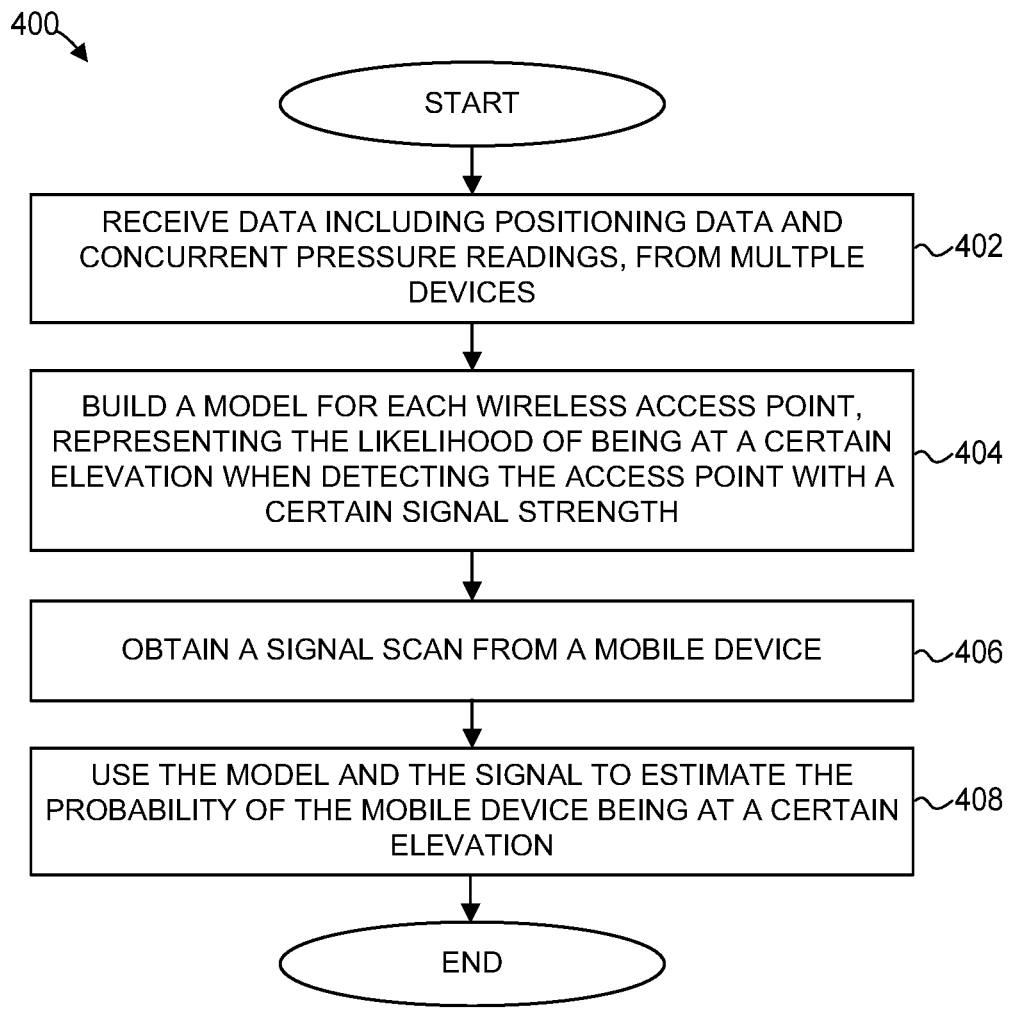
Figure 13:
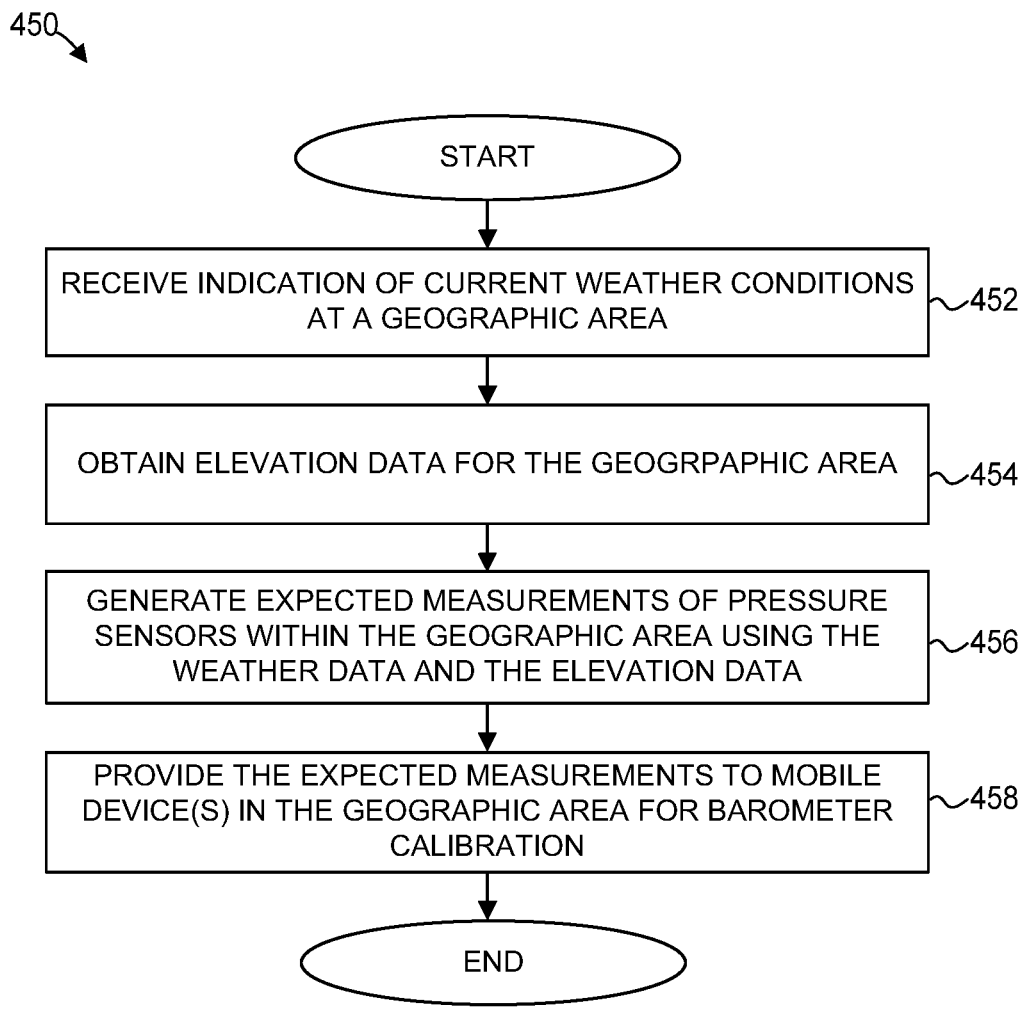
Figure 14:
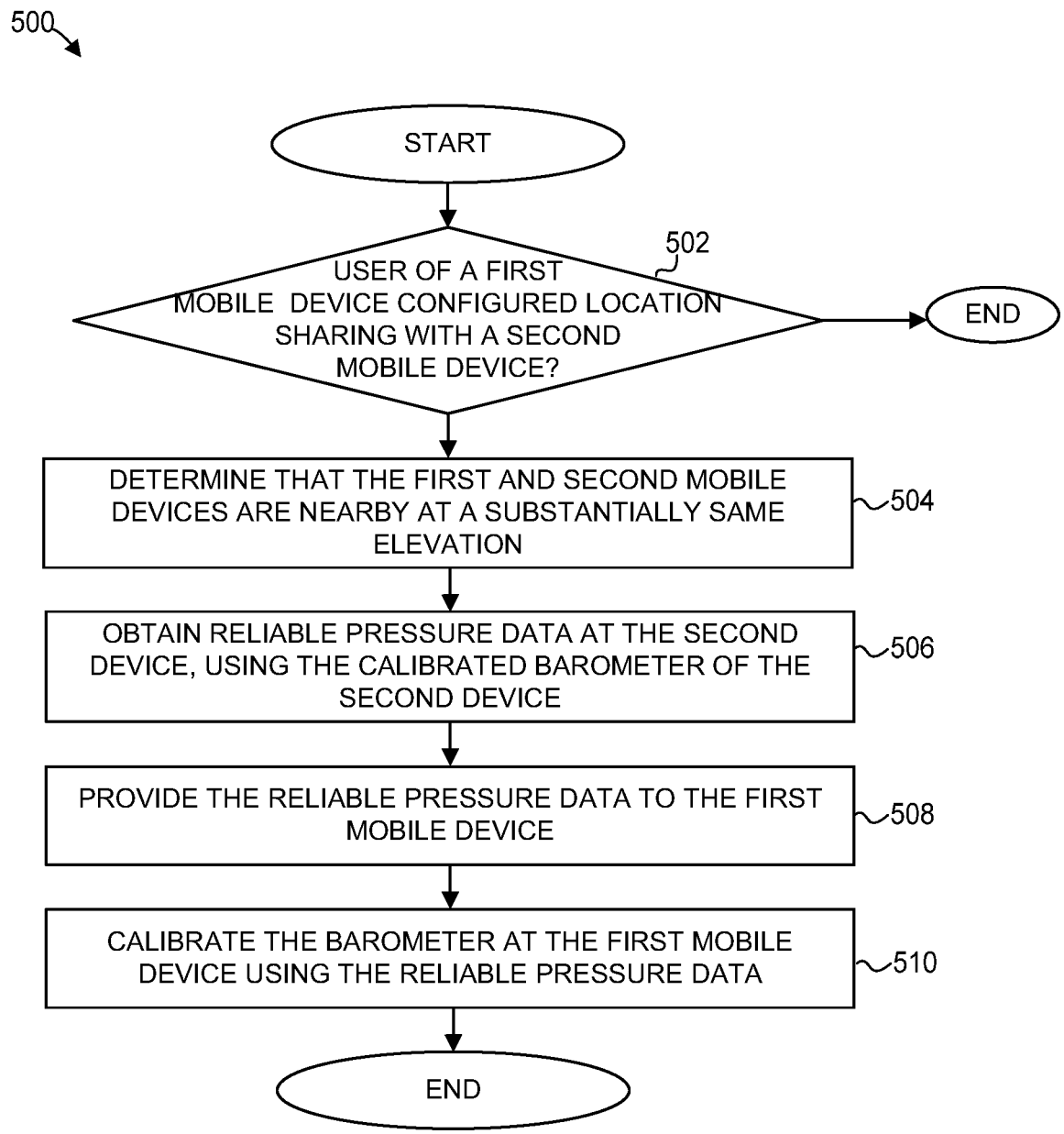
Figure 15:
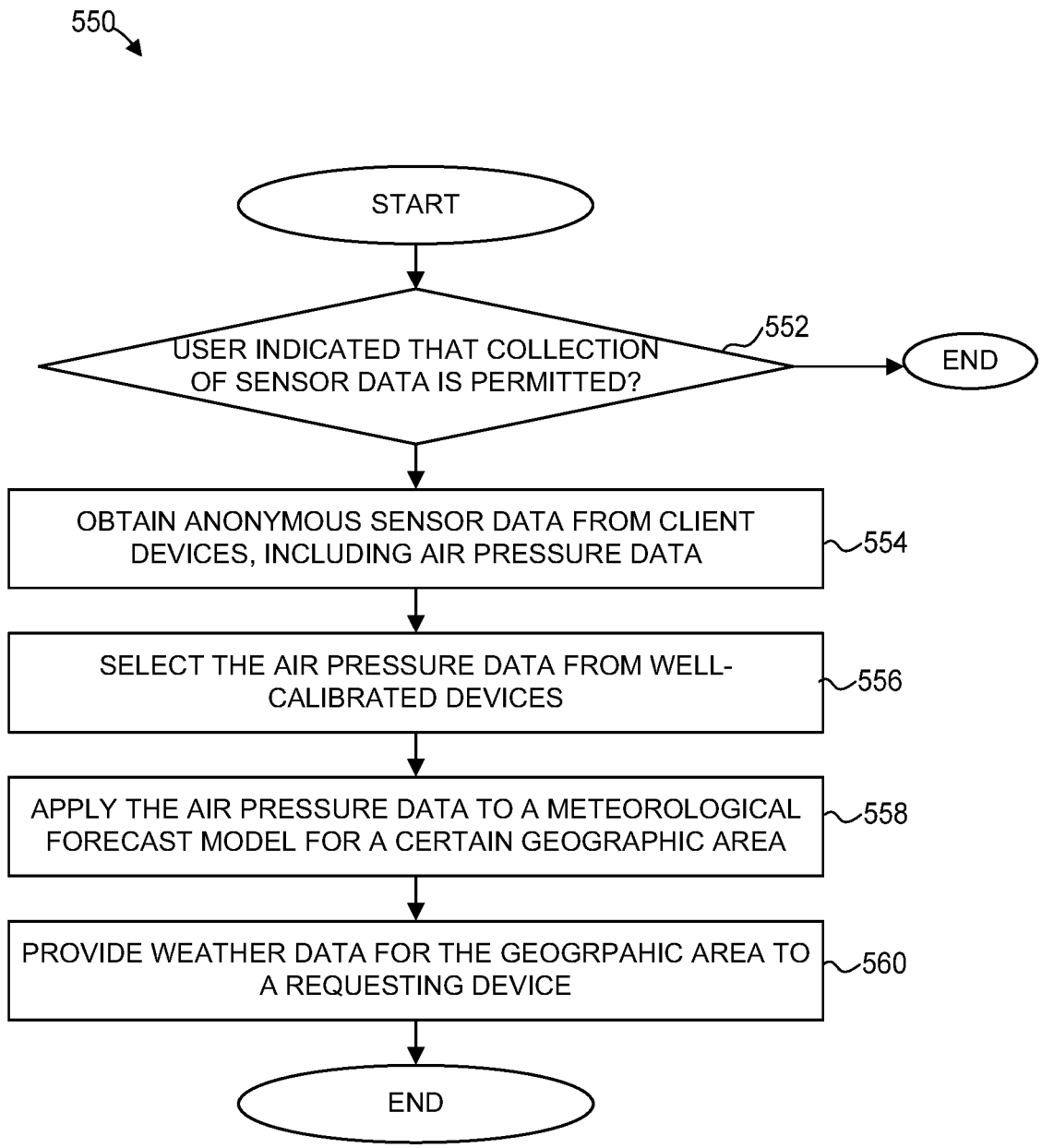
Figure 16:
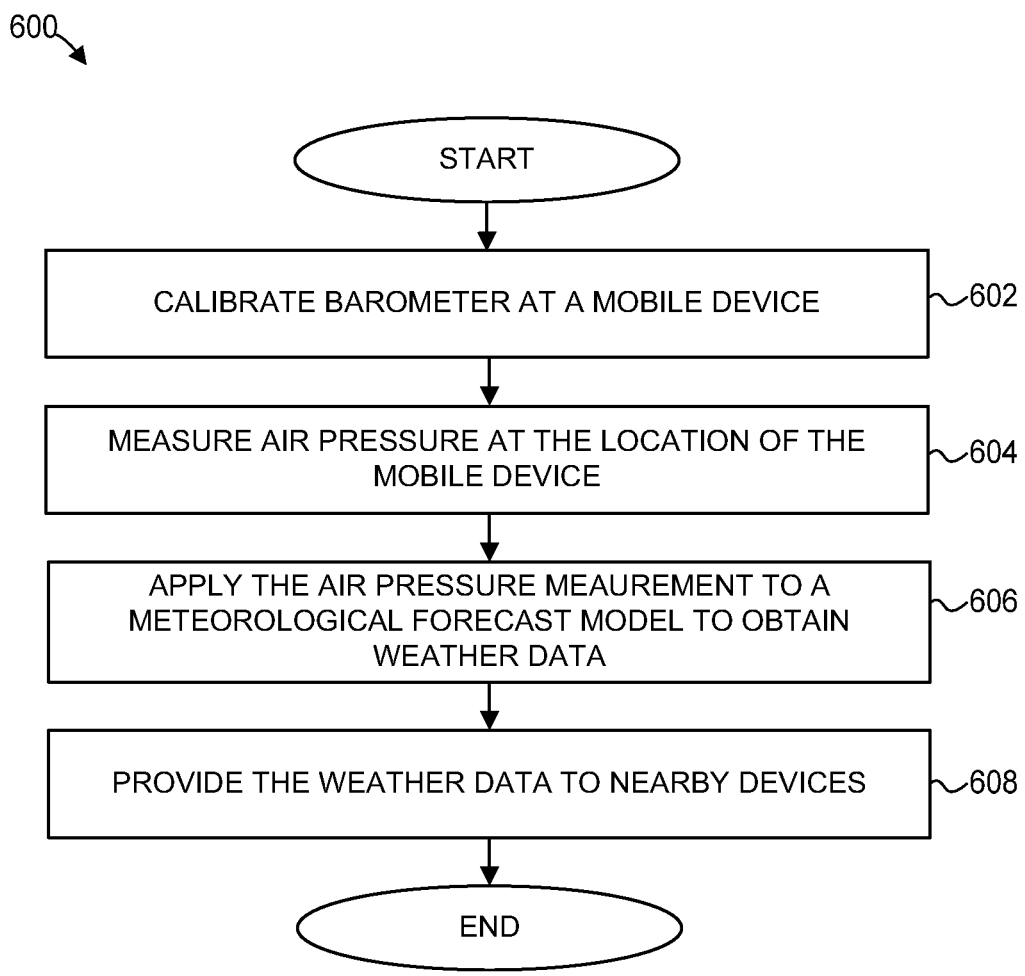
Figure 17:
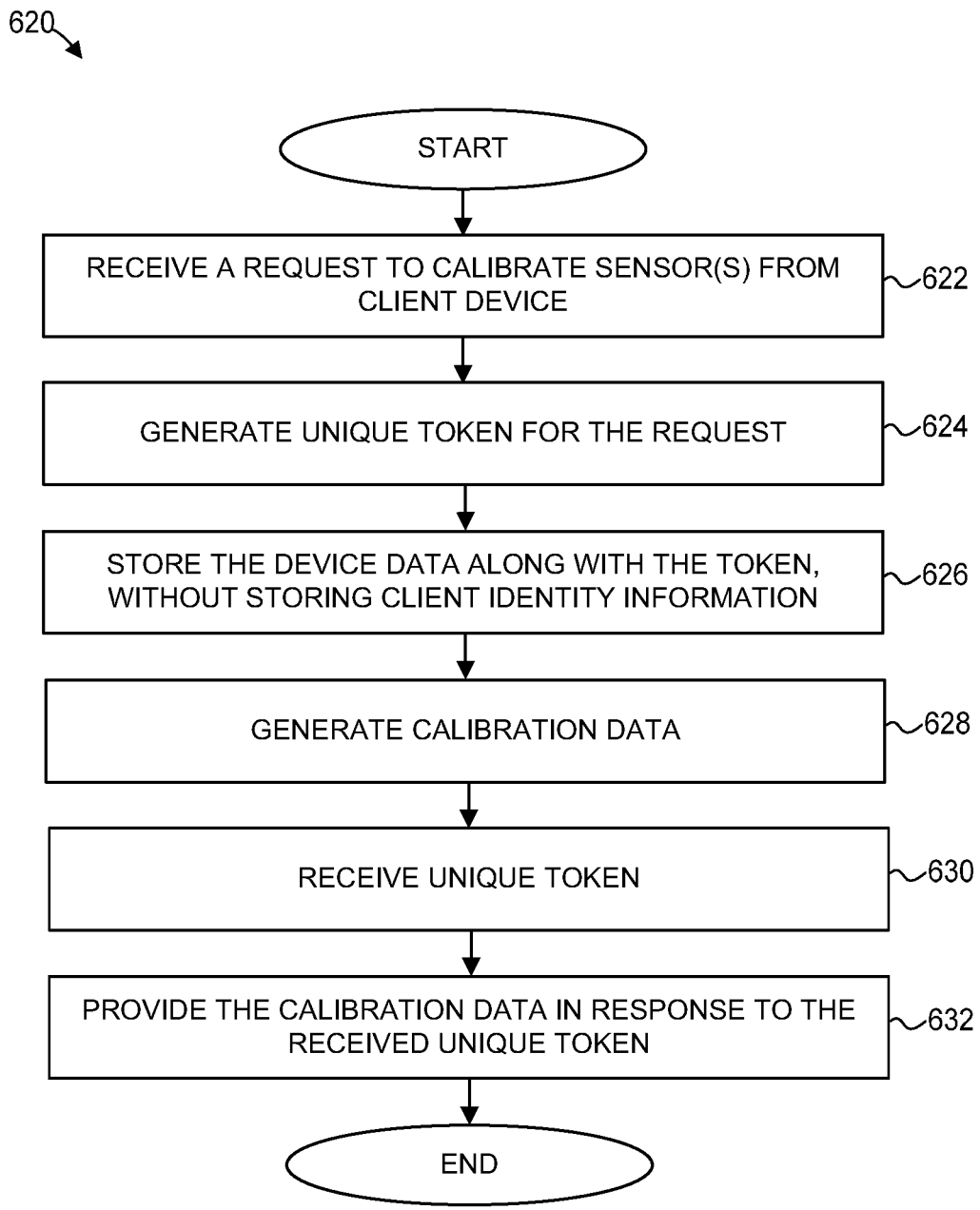

using multiple traces from mobile devices, which can be implemented in the system of FIG. 1;

FIG. 6 is a flow diagram of an example method for estimating the number of floors and/or floor separation using multiple traces from mobile devices, which can be implemented in the system of FIG. 1;

FIG. 7 is a flow diagram of an example method for applying geographic 3D anchors to determine absolute positions of geographic features using the previously determined relative vertical separation, which can be implemented in the system of FIG. 1;

FIG. 8 is a flow diagram of an example method for mapping out hiking trails using changes in elevation, which can be implemented in the system of FIG. 1;

FIG. 9 is a flow diagram of an example method for adjusting crowdsourced elevation data from non-calibrated client devices using weather data, which can be implemented in the server of FIG. 1;

FIG. 10 is a flow diagram of an example method for adjusting location estimation at a client device using current weather data received from a server, which can be implemented in the client device of FIG. 1;

FIG. 11 is a flow diagram of an example method for estimating the height of a cluster of wireless signal sources using pressure averaging, which can be implemented in the client device of FIG. 1;

FIG. 12 is a flow diagram of an example method for developing and applying a model for each wireless access point, the model providing the likelihood of a certain elevation for a given signal strength measurement, which can be implemented in the system of FIG. 1;

FIG. 13 is a flow diagram of an example method for generating calibration data for mobile devices using elevation data for a geographic area and the current weather conditions at the geographic area, which can be implemented in the system of FIG. 1;

FIG. 14 is a flow diagram of an example method for calibrating the barometer of a mobile device using the calibrated barometer of a peer mobile device determined to be nearby at a substantially same elevation, which can be implemented in the system of FIG. 1;

FIG. 15 is a flow diagram of an example method for generating weather forecast predictions using crowdsourced sensor data from multiple client devices, which can be implemented in the server of FIG. 3;

FIG. 16 is a flow diagram of an example method for providing current weather data to nearby devices from a mobile device with a calibrated barometer, which can be implemented in the system of FIG. 1; and FIG. 17 is a flow diagram of an example method for server-side anonymous sensor calibration of mobile devices, which can be implemented in the system of FIG. 1.

DETAILED DESCRIPTION

In the environment described below, multiple mobile devices equipped with air pressure sensors such as barometers report sequences of atmospheric pressure readings ("traces") along with measurements of satellite positioning signals, wireless local area network (WLAN) signals, beacons, magnetic fields, and/or other "signals of opportunity." The common or sufficiently similar measurements of these signals of opportunity can yield similarity metrics, which in turn allow data points from different traces to be grouped together. The similarity metrics can correspond to segments of traces of a certain duration, for example. A system of this disclosure generates and uses similarity metrics to determine how traces from mobile devices indicate changes in the elevation of the mobile devices over time. The system thus determines 3D geometry of indoor and/or outdoor spaces. Further, the system in some implementations adjusts elevation estimates and/or generates calibration data for mobile devices in view of current weather conditions.

FIG. 1 illustrates an example computing system 10 in which the techniques of this disclosure can be implemented. The system 10 includes a location provider 12 that receives signal data from mobile devices 14 and generates elevation data, calibration data, etc., for use by the mobile devices 14 and other devices, such as various mapping and navigation services. The location provider 12 can be implemented as one or several server devices, as discussed below. The location provider 12 and the mobile device 14 can communicate via a communication network 20, which can be a wide area network such as the Internet. The location provider 12 and the mobile device 14 also can access a weather service 16 via the network 20, in some scenarios.

The system 10 further can include a signal/time measurement database 22, a surveyed results database 24, a user database 26, and a terrain and floor plan database 28, which can be implemented as parts of a same database or separate databases, depending on the implementation. The databases 22 and 24 can store information collected from various types of mobile devices from various geographic areas, and at various times using crowdsourcing. In particular, the signal/time measurement database 22 can store passive traces, and the surveyed results database 24 can store located traces.

More specifically, a trace from a mobile device 14 can include a variety of measurements, collected over time and/or at various locations, from multiple different sensors of the mobile device. Each trace can be initially recorded in a log implemented in the memory of the mobile device 14 and subsequently uploaded to the location provider 12 for storage in the database 22 or 24, or the location provider 12 can receive sensor readings from a mobile device 14 substantially in real time. The period of time over which a trace is collected over the last few seconds, several minutes, or even hours or days.

As used herein, "passive" traces refer to sequences of observations the mobile devices 14 generate without additional user input. For example, a mobile device may collect over some period of time "raw" data recorded by various sensors including WLAN AP signal strength measurements, GPS signal readings, magnetic field measurements, barometer readings, accelerometer readings, gyrometer readings, proximity sensor readings, Bluetooth signal readings, etc. Some of these signals are positioning signals (e.g., GPS), while others can be used to estimate position indirectly (e.g., magnetic field measurements, WLAN AP signals), and can be referred to as "signals of opportunity." Passive traces can include additional data such as timestamps for every measurement.

Although a passive trace also can include "position fixes," i.e., estimates of the geographic location at certain times, position fixes in a passive trace are not reliably localized relative to a map of an outdoor or indoor area and, more generally, are associated with low accuracy. GPS position fixes, for example, can include a large error in so-called urban canyons, where a satellite signal can be reflected off building walls, sometimes multiple times, before reaching a GPS receiver. Examples of non-localized observations from a mobile device include the following: "at time t=2 s, the GPS module reported generate a position fix of lat=23.56789, lng=67.23456," "at time t=2.1 s, WiFi access point P1 was observed with signal strength −65 dBm and WiFi AP P2 was observed with signal strength −58 dBm," "at time t=2.2 s, a step forward was made and the orientation changed by 10 degrees clockwise."

In contrast to passive traces, "localized" traces correspond to sequences of observations that are reliably positioned relative to each other and the rest of the world. For example, surveying can involve recording positions of devices relative to known locations, such as known GPS coordinates or geolocated landmarks. In some cases, people manually record surveyed locations into portable devices while the portable devices collect observations of wireless signals. Using techniques such as simultaneous localization and mapping (SLAM), for example, the location provider 12 can localize a passive trace to generate a "located" trace.

As used in this disclosure, the term "landmark" can refer to a signal source, such as a WLAN access point (AP), an obstacle such as a wall with certain geometry that restricts movement of a user or vehicle and/or attenuates wireless signals, an opening in a larger obstacle via which users or vehicles can pass, etc. Landmarks can serve as parameters in SLAM, for example, when generating a probabilistic geographic landscape and localizing traces.

As illustrated in FIG. 1, the mobile devices 14 can travel between locations inside or outside various structures, and the locations can have different elevations. Each example trace is schematically depicted as a sequence of circles representing positioning fixes accompanied by concurrent air pressure measurements. The trace for mobile device 14A in this example reflects positioning fixes at several locations on the ground floor of a building 40, a transition to the second floor of the building 40, positioning fixes at several locations on the second floor, and a transition to the third floor. A mobile device 14B, currently located on the second floor, has traveled from the ground floor up to the second floor, according to the corresponding trace. Further, a mobile device 14C has traveled from the ground floor of the building 40 to a location outside the building 40, according to the corresponding trace.

The building 40 can include various forms of indoor transport such as escalators or an elevator 42, as well as a stairwell 44. As discussed in more detail below, the location provider 12 can determine the locations in of these features inside the building 42 using traces from the mobile devices 14. The location provider 12 then can store the determined locations of stairwells and indoor transport in the terrain and floor plan database 28. Other data stored in the floor plan database 28 can include external floor outlines collected from 3D reconstruction and/or aerial imagery and, for some places, exterior and interior detailed floor plans.

With continued reference to FIG. 1, the user database 26 can store information specific to users, such as indications of whether users choose to share their locations, allow the location provider 12 to determine the locations of their mobile devices, etc. The user database 26 in some implementations also can store indications of whether the barometer at a certain mobile device is calibrated.

Generally speaking, the mobile devices 14 sense different air pressure at different elevations and, accordingly, at different floors of the building 40. However, weather conditions can affect pressure readings, and thus the mobile devices 14 cannot always rely on pressure readings alone to determine elevation. The weather service 16, which can be a third-party service accessible via an appropriate application programming interface (API), in some cases can provide weather data for a specified geographic region. Using this data, the location provider 12 and/or the mobile device 14 can adjust barometer data. However, the weather data may not be provided in real time and may not be sufficiently specific relative to geographic locations.

Figure 2:
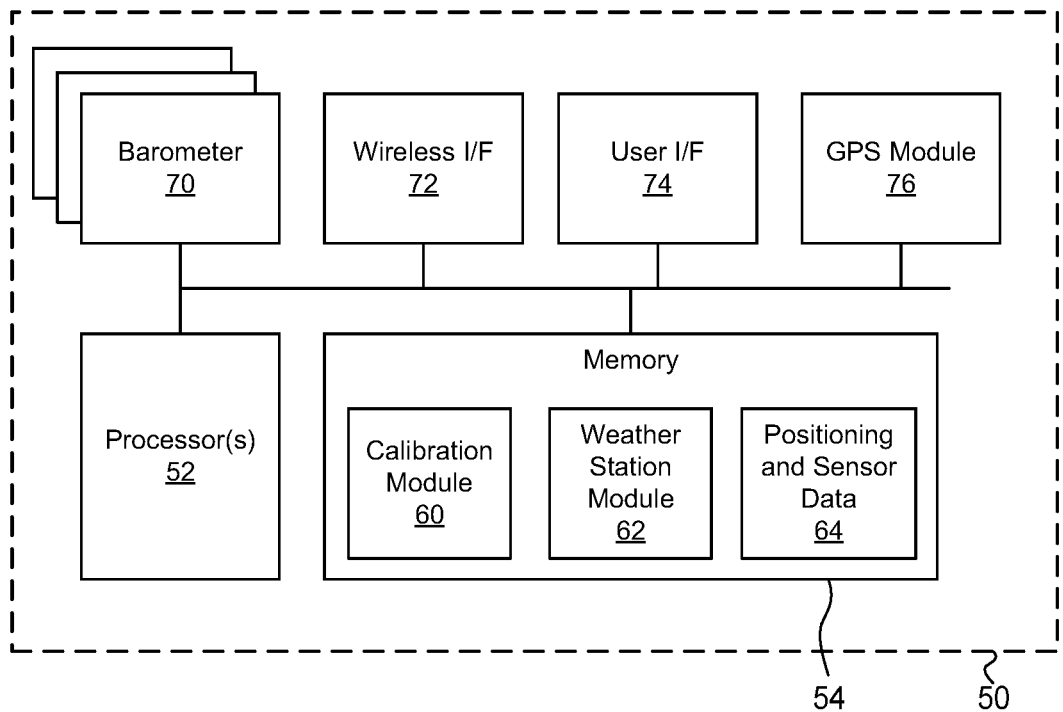
FIG. 2 is a block diagram of an example mobile client device that can operate in the system of FIG. 1.

FIG. 2 is a block diagram of an example mobile device 50 that can operate as the mobile device 14 in the system of FIG. 1. The mobile device 50 can be a smartphone, a wearable electronic device such as a smart watch, a tablet computer, a laptop computer, etc. The mobile device 50 can include one or more processors 52 such as a central processing unit (CPU) and a graphics processing unit (GPU), a computer-readable memory 54 that can include persistent (e.g., a hard disk, a flash memory unit) as well as non-persistent (e.g., RAM) components, various sensors including a barometer 70, a wireless interface 72 that can support cellular communications, WLAN (e.g., WiFi®) communications, WPAN (e.g., Bluetooth®) communications, etc., a user interface 74 such as a touchscreen, and, in some cases, a GPS module 76. The memory 54 can store instructions that implement a calibration module 60 and a weather station module 62. The memory 54 also can store positioning and sensor data 64.

In operation, the mobile device 50 can collect measurements of various signals of opportunity using the sensors, the wireless interface 72, and the GPS module 76 as positioning and sensor data 64. The mobile 50 can be configured to provide some of the positioning and sensor data 64 to the location provider 12 regardless of the current activity (phone in sleep mode, active call, messaging, etc.), provided the user indicated that he or she is willing to share the data with the location provider 12.

The calibration module 60 can calibrate the barometer 70 using expected pressure measurements received from a nearby peer mobile device or a network server such as the location provider 12 of FIG. 1. The data suitable for calibration can indicate, for example, that the air pressure at a certain time t at the current location of the mobile device 50 should be P. Example techniques for generating and applying barometer calibration data are discussed in more detail below.

The weather station module 62 can transmit local weather data or simply reliable air pressure measurements to nearby devices and/or a network server, when the barometer 70 is properly calibration. In some implementations, the weather station module 62 implements a meteorological model that uses air pressure as one of the inputs. The techniques for using the mobile device 50 as a roving weather station are discussed in more below.

FIG. 3 is a block diagram of an example server 100 that can operate as the location provider 12 in the system of FIG. 1. The server 100 includes one or more processors 102, a computer-readable memory 104, and a network interface 106. The memory 104 can store instructions that implement a weather prediction module 110, a calibration module 112, and a mapping module 114.

The server 100 can be made up of one or multiple server devices, each equipped with non-transitory computer-readable medium and one or more processors. The components of the computing system 100 can be disposed at different physical locations and interconnected via a communication network, if desired.

In operation, the weather prediction module 110 can generate weather data for a certain geographic location using crowdsourced data. To this end, the weather prediction module 110 can generate crowdsourced air pressure measurements and apply these measurements to a meteorological model. The weather prediction module 110 can provide the weather data to the mobile devices 14 and/or online services.

The calibration module 112 can use crowdsourcing techniques to generate expected air pressure measurements at various locations and, depending on the implementation, provide the expected air pressure measurements to mobile devices for use in calibrating barometers or generate correction data for various types of barometers, to be used at the mobile devices to offset the sensor bias.

With continued reference to FIG. 3, the mapping module 114 can generate mapping information for various locations using crowdsourced location and elevation data. For example, the mapping module 114 can determine that the multiple traces at a certain location indicate that the mobile device appear to be carried at three vertical levels, suggesting that these mobile device are in a three-story building. The mapping module 114 accordingly can update the database (e.g., the database 26 of FIG. 1) to indicate probable presence of a three-story building. Further, the mapping module 114 can automatically estimate the locations of stairwells, escalators, elevators, etc. Still further, the mapping module 114 can map out the probable locations of hiking trails.

Example operation of the modules 110-114, as well several other modules mentioned above, is discussed in more detail with reference to the flow diagrams below. Generally speaking, the methods illustrated in the flow diagrams of FIGS. 4-17 can be implemented in hardware, software, firmware, or any suitable combination thereof. For example, these methods can be implemented as sets of instruction stored on a non-transitory computer-readable medium and executable by one or more processors. Some of the methods can be implemented in a server such as the location provider 12, some can be implemented in a mobile device such as the mobile device 14, and some can be distributed between multiple devices in a suitable manner.

Figure 4:
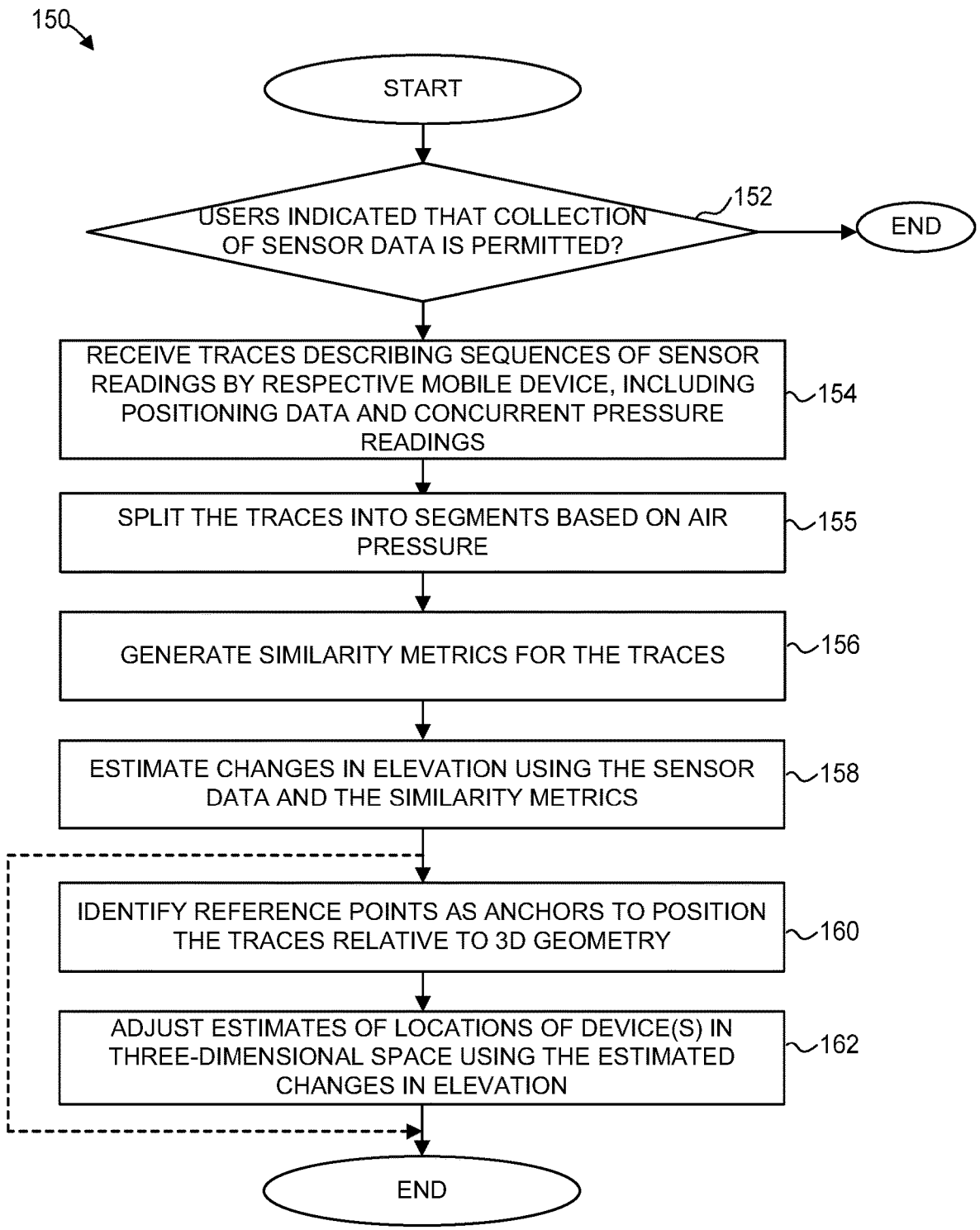
FIG. 4 is a flow diagram of an example method for using multiple traces from mobile devices and concurrent pressure readings to estimate changes in elevation, so as to adjust estimates of locations of devices in three-dimensional space, which can be implemented in the system of FIG. 1.

Referring first to FIG. 4, an example method 150 for using multiple traces from mobile devices and concurrent pressure readings to estimate changes in elevation for the purposes of mapping, geopositioning, etc. can be implemented in the location provider 12 of FIG. 1, for example, or any suitable system. For convenience, the method 150 is discussed below with reference to the location provider 12.

At block 152, the location provider 12 checks whether a user has indicated that his or her data can be applied in estimating elevation using crowdsourcing techniques. The method 150 ends if the user has not indicated that the data from the mobile device can be used in this manner. This step can apply to every mobile device that potentially can participate in the crowdsourced estimation of elevation data.

At block 154, traces describing sequences of sensor readings are received. A trace can include barometric readings (atmospheric pressure in millibars or hectopascals, for example) along with location-depending sensor readings, or signals of opportunity. For example, certain mobile devices can report WLAN received signal strength (RSS) scans such as (MAC, RSS) tuples. The RSS can be measured in dB or dBm, for example. The MAC uniquely identifies the wireless interface of the device. It is noted that APs with multiple interfaces and thus multiple interfaces can be considered without impacting the technique (e.g., as traces from multiple devices) or detected and ignored, depending on the implementation. Some mobile devices can alternatively or additionally report magnetic field readings, wireless personal area network (WPAN) readings such as Bluetooth readings, near field communication (NFC) readings, etc.

To minimize the impact of changing weather on the barometer readings, measurement sets (traces) of relatively short durations can be used, assuming that the weather conditions are the same during such time which is a valid assumption most of the time. In some implementations, the location provider 12 accounts for possible changes in weather by modeling the impact of the weather on the barometer readings as smooth function (e.g., a linear function) of time.

In some implementations, the location provider 12 accounts for possible changes in weather in the final optimization, for example by modeling the impact of the weather on the barometer readings as smooth function of time (for example a linear function of time).

Additionally, the location provider 12 can store in a database information about the signals of opportunity for positioning purposes. For example, the location provider 12 can associate WLAN or WPAN transmitters with the floor on which these devices are likely located, along with the strongest RSS measurement, mean RSS measurement, the average period of time during which these signal sources are detected in each segment of a floor, etc.

Next, the traces can be split into segments based on variations in air pressure, at block 155. Referring for example to the trace of the mobile device 14A schematically illustrated in FIG. 1, the measurements corresponding to the positioning fixes on the ground floor typically will have similar air pressure readings, the measurements corresponding to the positioning fixes on the second floor also should similar air pressure readings different from the readings on the ground floor, and the measurements corresponding to the positioning fixes on the third floor also should similar air pressure readings different from the readings on the ground floor or the second floor. As a more specific example, the readings on these three floor can have values of $P1\pm\Delta$, $P2\pm\Delta$, and $P3\pm\Delta$, where $\Delta<<(P3-P2)\approx(P2-P1)$. Accordingly, the trace for the mobile device 14A can be split into three segments, one for each floor, based on the relatively small differences between barometric readings on a same floor relative to the relatively large differences between barometric readings on different floors.

However, because air pressure at the same elevation can change due to weather factors, the segmentation at block 155 in some implementations is further restricted based on time. Thus, for example, if a certain user spends two hours on one floor, the barometric readings during this time can vary significantly. Accordingly, a window of a certain fixed size (e.g., 5 seconds, 1 minute, five minutes) can be used to enforce the additional proximity-in-time requirement, at this block or block 156 discussed below.

At block 156, similarity metrics are generated to identify instances where sensor readings correspond to the same locations. Each similarity metric can correspond to a segment of a trace and a segment of another trace. In one example implementation, each segment is limited by a predetermined length of time. More particularly, to associate the height of a trace T1 at time t1 with the height of another trace T2 at time t2, a measure of similarity between the traces is generated. To this end, the size of a window W can be computed in real time based on the data (e.g., the size of the data set) or selected.

In one example implementation, the RSS fingerprints are correlated along a time window (for example of the order of 5~10 seconds), and a threshold is applied to generate a correlation metric and determine whether the mobile terminals in two traces are located on the same level. In some cases, this approach may be restrictive, as the estimation is generally more accurate when two traces share at least a portion of the trajectory.

In another example implementation, correspondence between trace segments is identified based on a shared, strong RSS measurement above a certain threshold, for a common AP. This option can require proximity to at least one AP, and this approach can benefit from high Floor Attenuation Factor (FAF). Although FAF are often above 15 dB, in open spaces this number can decrease to less than 10 dB. In the case of n>2 set of measurements from different users, these sets do not have to share the same APs, as the problem can be restricted to a sequence of n−1 atomic associations: in the first stage two traces are associated by means of one or more APs, and at each stage a new trace is added by using a potentially different subset of APs.

Further, the detection of similarities can be constrained to times when the barometer is providing stable pressure measurements. This ensures that even if the accuracy of the similarity detection is not perfect, the impact on the final altitude estimates will be minimal.

Further, measurement sets from different pedestrians can be grouped to reduce the complexity of the similarity search process. This can be done using any kind of measure to group measurements sets belonging to the same area. Example of such measures are GPS similarity, mobile network similarity and other sources.

Still further, WLAN similarity can be "tuned" on the fly or beforehand to further reduce the probability of erroneously detecting similarities between traces located at different elevation. For example, when similarity detection uses a rule of the type "when two trace observe an AP at signal strength>x, these traces are similar at this instant," then x can be chosen differently for different APs so that false positives within a single trace can be avoided. For example, if a certain AP is observed at strength −60 dB, and then observed at strength −70 dB on the next floor, x can be selected to be larger than −70 dB.

At block 158, changes in elevation for various traces can be estimated with higher accuracy. To this end, segments of traces determined to be similar at block 156 are logically linked or clustered. Other unknowns can be determined by linking similar traces include barometer calibration data, weather effects, air conditioning effects that effectively create different weather conditions on particular floors or even rooms), etc.

The changes in elevation can be used to create a vertical map of a geographic area. As signals of opportunity and barometer measurements are usually noisy, an optimizer can be added for more reliable and accurate vertical map generation. In one such implementation, a floor change detector can be used to define flat and floor changing segments, similarity metrics for signals of opportunity can be used to connect different points of the traces, and the results can be supplied to an optimizer to estimate the floor heights of each trace in time along with the number of floors. The links between instants of several traces can be used to create a graph of constraints, and this graph can be optimized using non-linear least squares or other techniques, similar to graph-based SLAM, for other. The output of the optimization is the height of each trace at all points in time.

In some cases, the flow may proceed to block 160, where reference points are identified for use as anchors in aligning the relative elevation data with 3D geometry. The resulting vertical map is a relative map and can be turned into absolute vertical map if few absolute anchors such as GPS height measurements are concatenated with the vertical map. Other types of absolute measurements can also be used for this purpose. For example, measurements from pre-surveyed WLAN APs and/or WPAN transmitters with known positions and terrain elevation maps can used.

At block 162, the results of the processing steps 154-160 can be used to estimate locations of devices in a three-dimensional space. For example, the linked traces can be used as anchors in 3D pedestrian navigation. More generally, the method 150 allows different points of the segments from all the measurement sets of all pedestrians around the world of flat and non-flat regions based on WLAN scans, considering that many of these segments will have floor changes that were observed in the barometer readings, will result in a vertical map of a large number of buildings.

Generally speaking, the approach outlined above allows the location provider 12 or a similar device to generate elevation data with low complexity, at low cost and low effort. This approach does not require an extra setup (as it relies on the available sensor data) and is scalable. Moreover, the number of sensors required need not be large.

As indicated above, in some implementations, a system can determine locations of mobile devices within a 3D structure by detecting the distinct patterns associated with climbing stairs or riding escalators. The sensor readings collected when a user is climbing stairs, riding on escalator, or is in an elevator are distinct. The system can map identify these patterns and map out the locations of such places.

Referring again to the location provider 12 of FIG. 1 for convenience, the location provider 12 can calculate the rate of ascension and determine whether the rate is consistent with a regular elevator, a high-speed elevator, etc. A certain combination of vertical and horizontal displacement over a unit of time can be indicative of an riding an escalator, and yet another combination of vertical and horizontal displacement over a unit of time can be indicative of climbing stairs. Potential applications of this approach include detecting the probable locations of stairwells and vertical transport in airports, shopping malls, tall buildings, etc.

Figure 5:
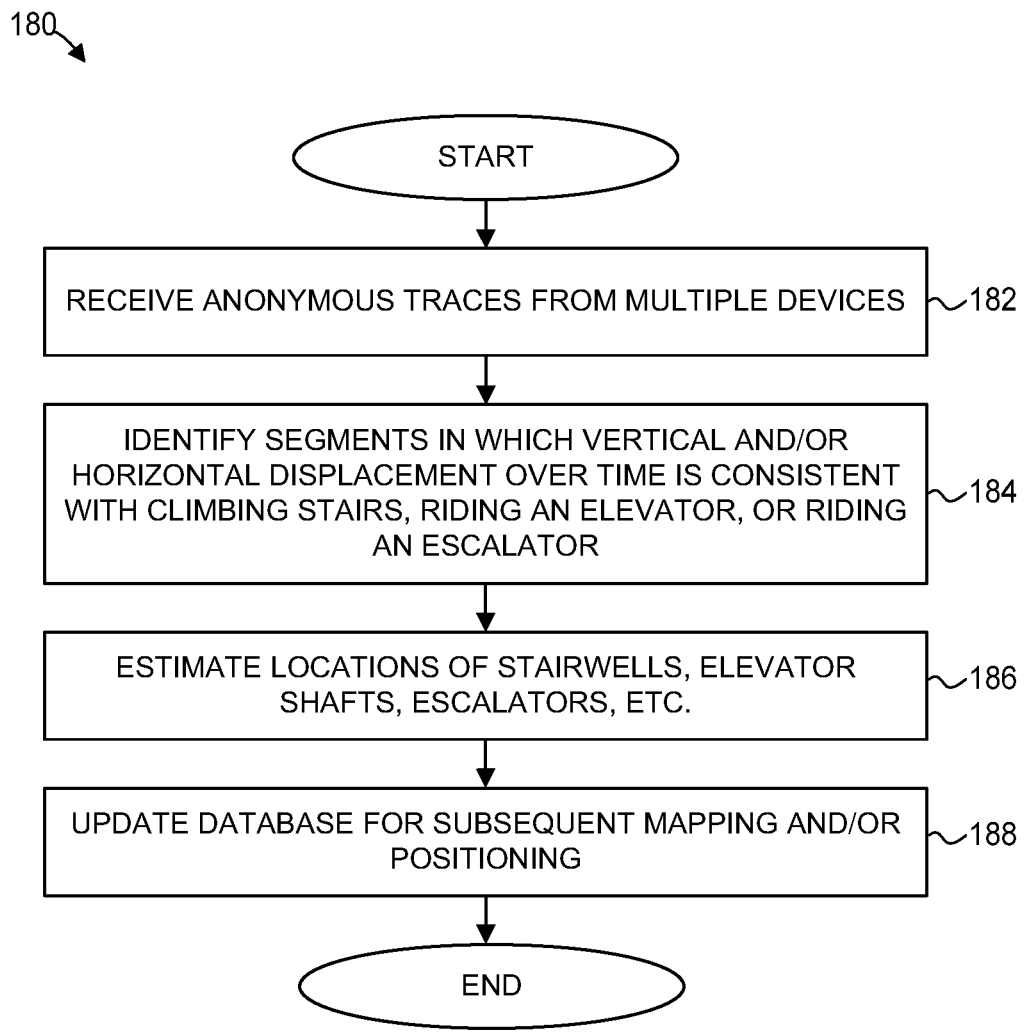
FIG. 5 is a flow diagram of an example method for estimating locations of stairwells, elevators, escalators, etc.

For further clarity, FIG. 5 illustrates a flow diagram of an example method 180 for mapping the locations of stairwells and/or vertical transport using multiple traces from mobile devices. For convenience, the method 180 is discussed with reference to the location provider 12 illustrated in FIG. 1.

At block 182, anonymous traces are received from multiple devices. Next, at block 184, the location provider 12 identifies segments in which vertical and/or horizontal displacement over time is consistent with mechanized or non-mechanized transitions between floors. At block 186, the locations of stairwells, elevator shafts, escalators, etc. are estimated. At block 188, one or several databases are updated. For example, a floor plan database can be updated with probable locations of stairwells or vertical transport.

Subsequently, the location provider 12 or another component can generate digital maps that illustrate the locations of stairwells or vertical transport. Further, the locations of stairwells or vertical transport can be used in indoor navigation.

Typically, a user revisits certain places over the course of days, weeks, etc. The location provider 12 can use multiple observations for a user or a group of users to determine floor separation. In some implementations, the location provider 12 can determine absolute altitude by accounting for pressure in view of current weather conditions. The location provider 12 then can identify sets of readings consistent with climbing stairwells, etc. and walking on a flat surface, and determine both the floor count and floor separation. For each building, the location provider 12 can build up an estimate of all the floor heights from crowdsourced data by a number of users.

In another implementation, the location provider 12 does not require that the absolute elevation be determined. WLAN signal similarity could identify different floors of buildings. The relative separation between floors would be measured from air pressure change when a user changes floors (e.g. goes downstairs). The complete number of floors and their separations from a building can be found using Random Sample Consensus (RANSAC) or another similar technique, by analyzing a large number of these floor changes.

Now referring to FIG. 6, an example method 200 for estimating the number of floors and/or floor separation using multiple traces from mobile devices also can be implemented in the system of FIG. 1. At block 202, anonymous traces from multiple devices can be received. Next, at block 204, segments consistent with walking on flat surface can be identified. To this end, similarity in WLAN signal measurements can be used.

Floor separation and/or the number of floors then can be estimated at block 206. Depending on the implementation, an estimate of all the floor heights for a certain building can be built up using crowdsourced data. In another implementation, relative separation between floors can be measured based on changes in air pressure resulting from users going downstairs or upstairs. At block 208, one or more database for 3D mapping or positioning can be updated.

FIG. 7 is a flow diagram of an example method 250 for applying geographic 3D anchors to determine absolute positions of geographic features using the previously determined relative vertical separation, which can be implemented in the system of FIG. 1.

At block 252, relative vertical positioning of features can be estimated using multiple traces, as discussed above. At block 254, reference points can be identified as anchors to position the features relative to known geometry. One or more databases can be updated at block 256.

In some implementations, the system determines locations of hiking trails using the elevation changes and terrain information for a geographic area. For further clarity, FIG. 8 illustrates a flow diagram of an example method 280 for mapping the locations of hiking trails.

At block 282, anonymous traces from multiple devices traversing a geographic area can be received. Some of these users may be travelling along paths for which no information is available in the existing databases, or the users can form new paths. These users may be traveling through parks, reserves, etc. The common trajectories through the geographic are identified using the traces, at block 284. Next, at block 286, terrain information can be obtained for the geographic area. Probable hiking and/or biking trails are determined using the identified common trajectories and the information, at block 288. To differentiate between hiking and biking trails, average speed at which users move along the paths can be considered. One or more databases can be updated at block 290. The information can include lengths of paths, elevation profiles along with two-dimensional geometry, or 3D definitions of the paths.

As discussed above, the location provider 12 can provide local air pressure due to weather. Each phone calibrates its barometer sensor talking to the server for weather and terrain elevation. Then, each phone is able to calculate its current elevation at any time using a pressure measurement. The server can also provide a current building floor number for the elevation.

For a mobile device equipped with a barometer, (i) calibration of the barometer, (ii) current weather, and (iii) current elevation of the mobile device are related in that any of these three factors can be determined using the other two. According to one scenario, mobile devices report pressure readings from a location with known elevation (e.g., by reporting accurate GPS readings along with the pressure readings). Using current weather information for the location, a system can determine expected pressure readings for the mobile devices. These expected pressure readings can be used at the mobile devices or at the server to generate correction data for calibrating the mobile devices. Once calibrated, the mobile devices can determine weather conditions for subsequent measurements or for use by other devices.

Generally speaking, barometer readings can be used for reliable estimation in elevation when the barometer is calibrated, and when the effect of current weather conditions on air pressure is known. Moreover, a client device in some cases can use current weather data to calibrate its barometer.

FIG. 9 a flow diagram of an example method 300 for adjusting crowdsourced elevation data from non-calibrated client devices using weather data, which can be implemented in the system of FIG. 1. In this example, at block 302, traces describing sequences of sensor readings by mobile devices in a geographic area are received. For example, mobile devices can submit sensor readings including barometric measurements, and indicate that no adjustment to the air pressure due to weather was made (or this indication can be implied).

Next, at block 304, weather data for the geographic data is obtained. To this end, a server associated with a weather service can be queried, or data from "roving" (mobile) weather stations from the same geographic area can be received. The elevation estimates are adjusted using the weather data at block 304. Thus, a server can adjust an entire dataset when it is known that no adjustment was made on mobile devices, and when the effect of current weather conditions on air pressure is known. In a similar manner, these adjustments can be applied to data collected previously (e.g., a month) when relatively precise historical weather data is available.

FIG. 10 is a flow diagram of one such example method 320 for adjusting location estimation at a client device using current weather data received from a server.

The method 320 begins at block 322, where current weather data is received at a mobile device from a server for the relevant geographic area. At block 324, the barometer is calibrated using the current weather data. To properly calibrate the barometer using weather data, the elevation of the mobile device should be known. For example, the mobile device can determine that it is currently positioned on the $4^{th}$ floor of a building with known floor separation and known sea-level elevation of the ground floor. In some cases, the server supplies this information or similar terrain information to the mobile device along with the weather data. In other words, the server can supply both the weather data and the elevation data, and the mobile device calibrates its barometer.

Subsequently, elevation estimates are generated at the client device using the calibrated barometer at block 326. The accuracy of these estimates can degrade over time due to changing weather conditions. Accordingly, the mobile device can attempt to re-initiate barometer calibration after a certain period of time.

FIG. 11 is a flow diagram of an example method for estimating the height of a cluster of wireless signal sources using pressure averaging, which can be implemented in the client device of FIG. 1. At block 352, a cluster of wireless signal sources is identified. The clustering can be use a combination of MAC addresses and RSSI measurements, for example. At block 354, it is determined that the signature of the cluster varies strongly from one floor to the next. At block 356, a noisy estimated elevation of the cluster is determined. A running average also is created and stored in a database. When a new estimate becomes available at block 358, the running average is updated in the database at block 360.

Now referring to FIG. 12, a server such as the location provider 12 of FIG. 1 can implement an example method 400 to developing and apply an AP-specific signal model that provides the likelihood of a certain elevation for a given signal strength measurement.

At block 402, data from multiple devices, including positioning data and pressure readings, is received. A model for each wireless AP is built at block 404. Each model provides the likelihood that a device measuring certain signal strength from the AP is at certain elevation. At block 406, a signal scan is received from a device. Using the model, the probability of the mobile device being at a certain elevation is determined at block 408.

Next, FIG. 13 illustrates is a flow diagram of an example method 450 for generating calibration data for mobile devices using elevation data for a geographic area and the current weather conditions at the geographic area. The method 450 begins at block 452, where an indication of current weather conditions at a certain geographic area is received. At block 454, elevation data for the geographic area is received. Expected measurements of pressure sensors within the geographic area are generated using the weather data and the elevation data, at block 456. At block 458, expected measurements are provided to a mobile device. The mobile device can use this data for calibration.

Referring to FIG. 14, an example method 500 for calibrating the barometer of a mobile device using the calibrated barometer of a peer mobile device can be implemented in a mobile device such as the mobile device 14 of FIG. 1, for example. At block 502, the server verifies whether the user of the first mobile device configured location sharing with the second mobile device. At block 504, the peer is device is determined to be nearby at a substantially same elevation. Reliable pressure data at the second device is obtained using the calibrated barometer, at block 506. At block 508, the reliable pressure data is provided to the first mobile device. At block 510, the barometer at the first mobile is calibrated using the reliable pressure data.

FIG. 15 is a flow diagram of an example method 550 for generating weather forecast predictions using crowdsourced sensor data collected from multiple client devices. The method 550 can be implemented in the location provider 12 of FIG. 1, for example, or another suitable system.

The method 550 beings at block 552, where user's indication that he or she is willing to share the sensor data for crowdsourced location services is checked. At block 554, anonymous sensor data from client device is received. The anonymous sensor data includes pressure readings. Air pressure data from well-calibrated devices is selected at block 556. At block 558, the air pressure data is applied to a meteorological broadcast model for a certain geographic area. Weather data for the geographic area is provided to a requesting device at block 560.

Next, FIG. 16 illustrates a flow diagram of an example method 600 for providing current weather data to nearby devices from a mobile device with a calibrated barometer. At block 602, the barometer at a mobile device is calibrated. Air pressure is measured at the current location of the mobile device at block 604. The air pressure measurement is applied to a meteorological forecast model to obtain weather data at block 606. The weather data is provided to nearby devices at block 608.

FIG. 17 is a flow diagram of an example method 620 for server-side anonymous sensor calibration of mobile devices, which can be implemented in the location provider 12 of FIG. 1. The method 620 begins at block 622, where a request to calibrate sensors is received from a mobile device. At block 624, a unique token is generated for the received request. The token is stored in a database along with the device data, at block 626. The identity of the client device is not stored. Calibration data is generated at block 628. A unique token is received at block 630. The calibration data is provided in response to the received unique token at block 632.

Additional Considerations

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a cloud computing environment or as a software as a service (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

What is claimed is:

1. A method of positioning mobile devices in a three-dimensional space, the method comprising:
   receiving, by one or more processors, multiple traces, each trace corresponding to a sequence of atmospheric pressure readings from a respective mobile device;
   receiving, by the one or more processors, indications of signals received by the mobile devices from signal sources concurrently with the atmospheric pressure readings;

generating, by the one or more processors, similarity metrics for the multiple traces using the indications of other signals received by the mobile devices, the similarity metrics being indicative of associations between the signal sources and the atmospheric pressure readings, each of the similarity metrics corresponding to a segment with multiple atmospheric pressure readings of a first one of the traces and a segment with multiple atmospheric pressure readings of a second one of the traces to provide a quantitative indication of how similar the first and the second traces are; and determining, by the one or more processors, estimated changes in elevation over time for the multiple traces using the generated similarity metrics.

2. The method of claim 1, further comprising splitting at least some of the multiple traces into respective multiple segments, each segment corresponding to atmospheric pressure readings that differ by less than a certain fixed amount, wherein average atmospheric pressure readings at different segments differ from each other by more than the fixed amount.

3. The method of claim 2, wherein splitting the at least some of the multiple traces into respective multiple segments includes associating a portion of a trace with a single segment only when the portion of the trace is within a time window of a certain fixed duration.

4. The method of claim 2, wherein splitting the at least some of the multiple traces into respective multiple segments includes estimating a number of floors in a building.

5. The method of claim 2, wherein splitting the at least some of the multiple traces into respective multiple segments includes estimating vertical separation between floors.

6. The method of claim 1, wherein generating the similarity metrics includes:
correlating receive signal strength measurements between several of the traces along a time window of a fixed duration to generate a correlation metric, and
comparing the correlation metric to a similarity threshold value to determine whether the correlated traces traverse a same geographic area.

7. The method of claim 1, wherein generating the similarity metrics includes:
determining that receive signal strength measurements from several of the traces exceed a signal strength threshold, and that the signal strength measurements correspond to a common wireless signal source.

8. The method of claim 1, wherein determining the estimated changes in elevation includes:
receiving weather data for a time interval to which the traces correspond; and
modeling an impact of the weather data on the estimated changes in elevation over time as a smooth function of time.

9. The method of claim 1, further comprising:
detecting, in at least some of the multiple trace, horizontal and/or vertical displacement characteristic of ascending stairs; and
estimating a location of a stairwell using the detected displacement.

10. The method of claim 1, further comprising:
detecting, in at least some of the multiple trace, horizontal and/or vertical displacement characteristic of riding on an escalator; and
estimating a location of an escalator using the detected displacement.

11. The method of claim 1, further comprising:
detecting, in at least some of the multiple trace, horizontal and/or vertical displacement characteristic of riding in an elevator; and
estimating a location of an elevator using the detected displacement.

12. The method of claim 1, wherein receiving the indications of signals received by the mobile devices from signal sources concurrently with the atmospheric pressure readings includes receiving indications of one or more of:
signals from wireless local-area network (WLAN) access points,
signals from wireless personal area networks (WPAN) devices,
near-field communication (NFC) signals, or
magnetic field readings.

13. A computing system for positioning mobile devices in a three-dimensional space, the system comprising:
one or more processors; and
a non-transitory computer-readable medium storing thereon instructions that, when executed by the one or more processors, cause the system to:
receive multiple traces, each trace corresponding to a sequence of atmospheric pressure readings from a respective mobile device,
receive indications of signals received by the mobile devices from signal sources concurrently with the atmospheric pressure readings,
generate similarity metrics for the multiple traces using the indications of other signals received by the mobile devices, the similarity metrics being indicative of associations between the signal sources and the atmospheric pressure readings, each of the similarity metrics corresponding to a segment with multiple atmospheric pressure readings of a first one of the traces and a segment with multiple atmospheric pressure readings of a second one of the traces to provide a quantitative indication of how similar the first and the second traces are; and
determine estimated changes in elevation over time for the multiple traces using the generated similarity metrics.

14. The computing system of claim 13, wherein the instructions further cause the system to split at least some of the multiple traces into respective multiple segments, each segment corresponding to atmospheric pressure readings that differ by less than a certain fixed amount, wherein average atmospheric pressure readings at different segments differ from each other by more than the fixed amount.

15. The computing system of claim 14, wherein to split the at least some of the multiple traces into respective multiple segments, the instructions further cause the system to associate a portion of a trace with a single segment only when the portion of the trace is within a time window of a certain fixed duration.

16. The computing system of claim 14, wherein to split the at least some of the multiple traces into respective multiple segments, the instructions further cause the system to estimate a number of floors in a building.

17. The computing system of claim 14, wherein to split the at least some of the multiple traces into respective multiple segments, the instructions further cause the system to estimate vertical separation between floors.

18. The computing system of claim 13, wherein to generate the similarity metrics, the instructions further cause the system to:

correlate receive signal strength measurements between several of the traces along a time window of a fixed duration to generate a correlation metric, and compare the correlation metric to a similarity threshold value to determine whether the correlated traces traverse a same geographic area.

19. The computing system of claim 13, wherein to generate the similarity metrics, the instructions further cause the system to determine that receive signal strength measurements from several of the traces exceed a signal strength threshold, and that the signal strength measurements correspond to a common wireless signal source.

20. The computing system of claim 13, wherein to determine the estimated changes in elevation, the instructions cause the system to:

receive weather data for a time interval to which the traces correspond, and model an impact of the weather data on the estimated changes in elevation over time as a smooth function of time.

* * * * *